No. 840,605. PATENTED JAN. 8, 1907.
C. H. BROOKS.
TRANSMISSION GEAR.
APPLICATION FILED MAR. 30, 1906.
3 SHEETS—SHEET 1.
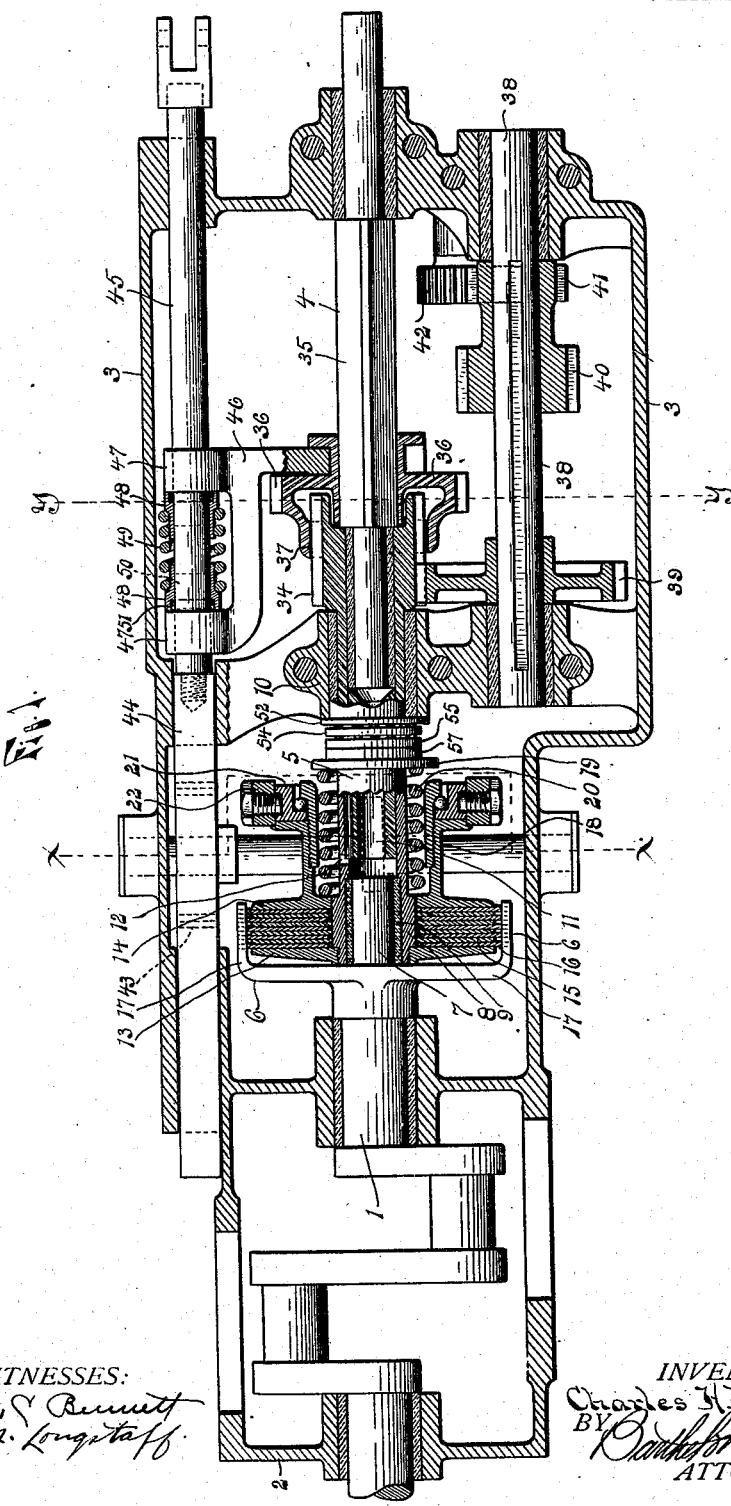
WITNESSES:
INVENTOR.
Charles H. Brooks
BY
ATTORNEYS.

No. 840,605. PATENTED JAN. 8, 1907.
C. H. BROOKS.
TRANSMISSION GEAR.
APPLICATION FILED MAR. 30, 1906.
3 SHEETS—SHEET 2.
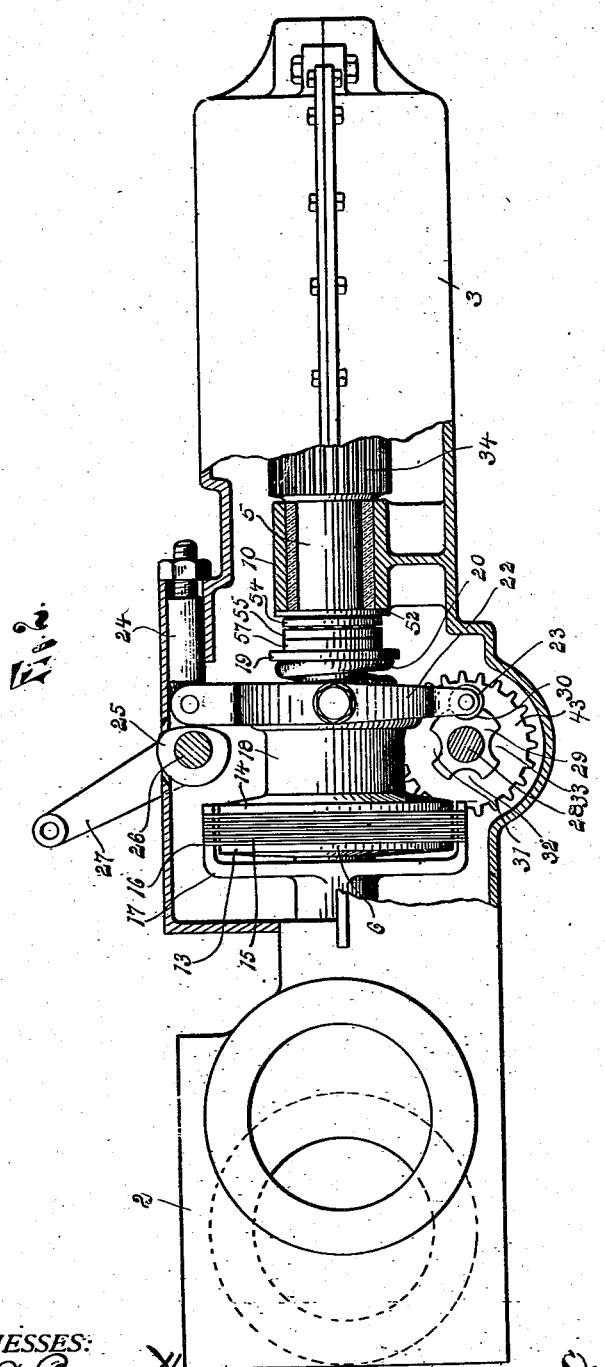
WITNESSES:
INVENTOR.
Charles H. Brooks
BY
ATTORNEYS

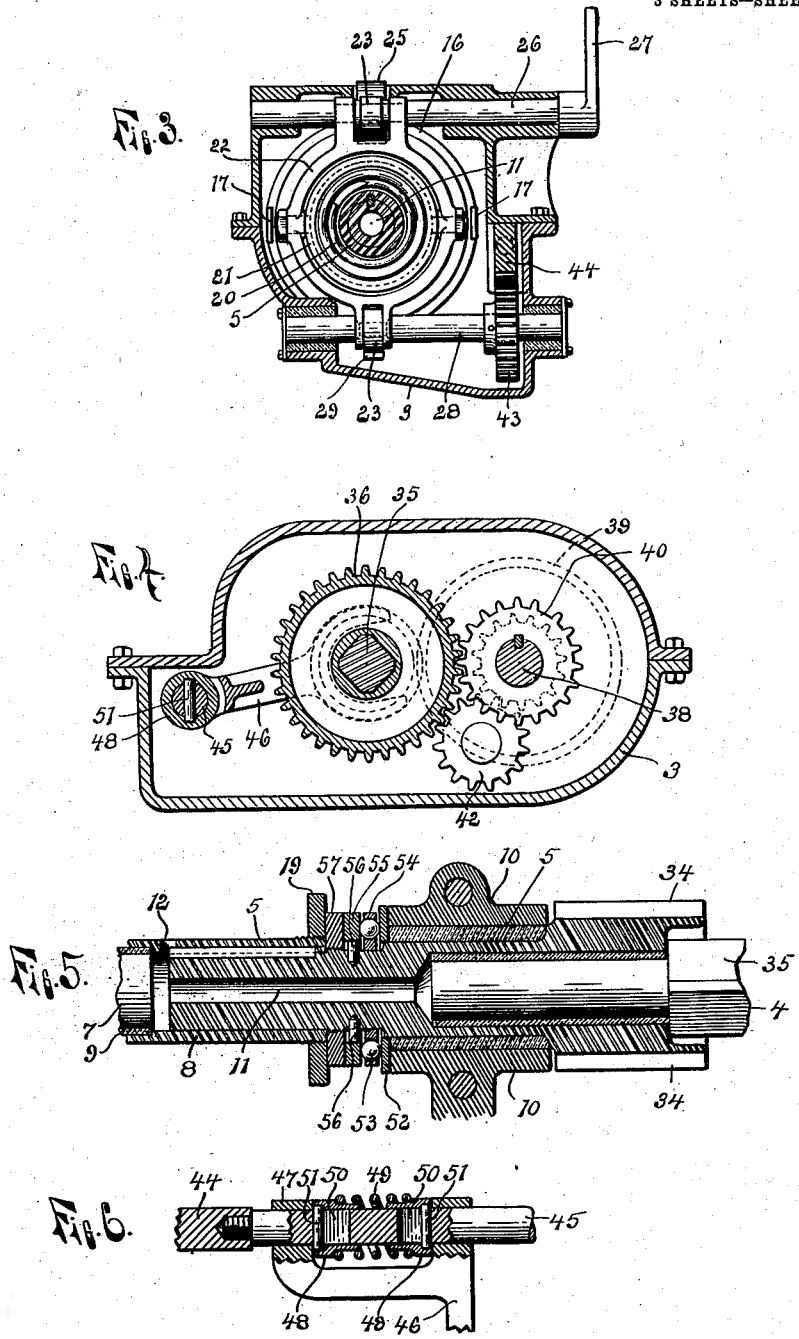

UNITED STATES PATENT OFFICE.

CHARLES H. BROOKS, OF DETROIT, MICHIGAN, ASSIGNOR TO THE BROOKS MOTOR COMPANY, OF DETROIT, MICHIGAN, A CORPORATION OF MICHIGAN.

TRANSMISSION-GEAR.

No. 840,605.   Specification of Letters Patent.   Patented Jan. 8, 1907.

Application filed March 30, 1906. Serial No. 308,858.

*To all whom it may concern:*

Be it known that I, CHARLES H. BROOKS, a citizen of the United States of America, residing at Detroit, in the county of Wayne and State of Michigan, have invented certain new and useful Improvements in Transmission-Gears, of which the following is a specification, reference being had therein to the accompanying drawings.

This invention relates to improvements in speed-changing power-transmission gearing of the class known as "sliding-gear" transmissions; and the object of the invention is to provide the same with new and efficient mechanism for releasing the clutch and shifting the gears by the movement of one lever and to provide means whereby should the shifting of the gears be prevented, by reason of their failure to at once come into mesh or from some other cause, a sufficient further movement of the lever will be permitted to release the clutch and the gears will be instantly thrown into mesh by said means upon the proper alinement of the gears.

A further object of the invention is to so construct the device that the clutch may be released at any time and held in that position independently of the shifting mechanism or the position of the gears without the necessity of shifting said gears or altering their relation or position, and to provide a device having the several advantages of the particular construction, arrangement, and combination of parts, all as hereinafter more fully described, reference being had to the accompanying drawings, in which—

Figure 1 is a longitudinal horizontal section of a device embodying the invention; Fig. 2, a side elevation of the same with parts broken away to show the construction. Fig. 3 is a transverse vertical section on the line *x x* of Fig. 1, drawn to a smaller scale; Fig. 4, a similar section on the line *y y* of Fig. 1. Fig. 5 is a sectional detail of the shafts and thrust-bearing, and Fig. 6 is a sectional detail of the yielding connection between the shifting rod and forked shifting arm.

As shown in the drawings, 1 is the crank-shaft, mounted in suitable bearings in the crank-case 2 of a double opposed motor, said crank-case being formed integral with the lower half of the casing 3 for the power-transmission mechanism.

4 is the driven shaft, mounted in suitable bearings in the casing in axial alinement with the crank-shaft, and 5 is a driving-shaft connected to the end of the crank-shaft by a friction-clutch 6. A reduced end 7 of the crank-shaft projects into the end of the tubular portion 8 of the driving-shaft with a bushing 9 between, and the bearing end of said driving-shaft projects into the opposite end of the tubular portion and is securely and rigidly keyed therein, said driving-shaft being thus made in two parts for convenience in manufacturing. Said bearing end is supported in a suitable babbitted bearing 10 on the casing, and it is axially bored inward from its rear end to receive a reduced end of the driven shaft and form a bearing therefor. A small axial bore 11 in said end extends therethrough to conduct oil inserted in the tubular portion of the shaft through an oil-hole 12 therein to the bearing for the reduced end of the driven shaft.

The clutch 6 consists of a facing-disk 13, secured upon the forward end of the tubular portion 8 of the driving-shaft, and an opposed facing-disk 14, with a series of friction-disks 15 and 16 between, the disks 15 being attached to the shaft to turn therewith and slide longitudinally thereof and the disks 16 being of greater diameter and formed with notches in their peripheries to receive the ends of a yoke 17, which is rigidly secured to the crank-shaft of the engine to cause said disks 16 to turn with said crank-shaft. On the back of the facing-disk 14 is a longitudinally-extending sleeve 18, and sleeved upon the driving-shaft within this sleeve, between said disk and a collar 19 on said shaft, is a heavy coiled spring 20, which normally exerts a force to move the facing-disk 14 toward the facing-disk 13 and clamp the friction-disks between.

Upon the rear end of the sleeve 18 is mounted a ring 21, with balls interposed between the sleeve and ring to turn freely, and a ring-yoke 22 embraces said ring and is pivotally attached thereto at each side by pivot-bolts passing through the yoke and engaging seats in the ring. Between upwardly-extending ears on the upper side of the yoke is journaled a roll 23, and a similar roll is journaled between downwardly-extending ears on the yoke at its lower side. An adjusting-pin 24 is pivotally attached at one end to the ears on the upper side of the yoke and slides within a bearing provided therefor in the casing, the opposite end of said pin being screw-threaded to receive an adjusting-nut, which may be adjusted to limit the inward movement of said pin, the same being free to slide outward in its bearing when the yoke is rocked by the engagement of a cam 25 with the friction-roll 23, said cam being secured upon a transverse shaft 26, mounted in bearings in the upper part of the casing and provided with an operating-lever 27, which may be connected with a hand or foot lever in any desired manner.

Mounted in bearings in the casing and extending across the same adjacent to the ears on the lower side of the yoke 21 is a shaft 28, upon which is secured a notched wheel or cam 29, consisting of a wheel or disk formed with the four deep notches 30, 31, 32, and 33 to receive the friction-roll 23, carried by the yoke.

Formed upon the bearing end of the driving-shaft 5 is a gear 34, having a long face, and upon the adjacent squared portion 35 of the driven shaft is mounted a gear 36 to slide freely thereon, said gear being formed with internal teeth 37 to engage the gear 34, and thus when said gear is in the position shown in Fig. 1 the driving and driven shafts are locked together by said gear to turn at the same speeds.

A counter-shaft 38 is mounted in bearings in the casing and extends parallel with the driven shaft, and on this counter-shaft is secured a gear 39 in mesh with the gear 34 to transmit motion from the driving to the counter-shaft. Secured upon the counter-shaft at a distance from the gear 39 is a smaller gear or pinion 40, adapted to be engaged by the external teeth of the sliding gear 36 when said gear is moved along its shaft and out of engagement with the gear 34, so that motion will then be transmitted from the driving-shaft through the large gear 39, counter-shaft, pinion 40, and large gear 36 to the driven shaft, which will thus be turned at a slow speed. A still smaller pinion 41 is secured upon the counter-shaft at a short distance to the rear of the pinion 40, and an idler 42 is mounted upon a stub-shaft on the casing in mesh with said pinion to engage the sliding gear when the same is moved farther along its shaft, and thus the motion of the driven shaft will be reversed. The distance between the gear 34 and the pinion 40 is such that when the sliding gear is moved on its shaft its internal teeth will be disengaged from the gear 34 before its external teeth will engage the said pinion, and thus in this position of the gear the driven shaft will be disconnected and no motion will be transmitted thereto.

Secured upon the transverse shaft 28 near one side of the casing is a pinion 43 and sliding in suitable bearings in the casing is a rack-bar 44 in engagement with said pinion, a rod 45 being secured to one end of said rack and extended outward through a bearing in the end of the casing for the attachment of an operating-lever, by means of which the rack may be shifted longitudinally. Mounted upon said rod 45 is a forked arm 46, the forked end of which is engaged with a groove in the hub of the shifting-gear 36, so that when the rack-bar is moved the sliding gear will be moved at the same time. This movement of the rack-bar turns the transverse shaft 28 and revolves the notched wheel 29, the roll 23 being thus forced out of its notch and the yoke 21 turned upon its pivotal connection with the pin 24 against the action of the spring 20, releasing the clutch. The clutch is thus released to disconnect the driving-shaft from the crank-shaft upon the first movement of the shifting rod 45 and before the sliding gear has been shifted into or out of engagement with the other gears, and thus the liability of stripping the teeth from the gears by bringing them into mesh while being driven is obviated. When the shifting gear is in the position shown in Fig. 1, the roll 23 is in the notch 30, and when the shifting rod is moved the notched wheel will be turned and said roll will engage the next notch 31, at which time the sliding gear will be out of engagement with both the gear 34 and pinion 40, in which position the rod will be held by the action of the spring 20 against accidental shifting. Further movement of the shifting rod slides the gear into engagement with the pinion 40, and turns the wheel to engage its notch 32 with the roll, and a still further shifting of the rod engages the gear with the idler and turns the wheel to engage the notch 33 with the roll.

If when the sliding gear is shifted its teeth should abut those of the gear with which they should mesh and should said gears be standing still, owing to the fact that the clutch has been thrown out by the shifting a further movement of the shifting rod sufficient to turn the notched wheel far enough to permit the clutch to operate, and thus turn the gears, is permitted by providing a yielding connection or limited relative movement between the shifting rod and forked arm. This connection consists in forming the arm with two bearing-eyes 47, through which the shifting rod extends, and sleeved upon the rod between these eyes are two sleeves 48 with a coiled spring 49 interposed. Two longitudinal slots 50 are formed in the rod, and in each of these slots is a transverse pin 51, engaged at their ends by the sleeves. The coiled spring thus exerts a force to normally hold the pins in the opposite ends of their slots; but when the arm is prevented from moving in either direction by the failure of the gears to mesh or from some other cause the rod may be moved longitudinally through the eyes a limited distance against the action of the coiled spring. When the gears abut and the shifting rod is moved, as described, to operate the clutch, as soon as the gears are turned into alinement they are instantly thrown into mesh by the action of said spring 49, and the wear on the gears and liability of breakage is greatly reduced by this yielding connection.

By moving the lever 27 to throw the cam 25 the yoke is turned upon the roll 23, engaging the notched wheel as its fulcrum, and the clutch is released at any time independently of the transmission-gearing and without the necessity of operating the shifting rod.

When the yoke 22 is moved to release the clutch, a heavy end thrust is put upon the driving-shaft, and to take this end thrust a thrust-bearing is provided on said shaft at the forward end of the bearing 10, consisting of a face-ring 52, placed against the end of said bearing, in contact with which ring the balls 53 run and are held by the retaining-ring 54. A face-ring 55, held by pins 56 to turn with the shaft, engages the balls at the opposite side and a collar 57, screw-threaded upon the shaft, engages said ring 55 to hold the same in place.

Having thus fully described my invention, what I claim is—

1. In a transmission-gearing, the combination with a power-shaft, of a driving-shaft, a clutch to connect the power and driving shafts, a driven shaft, gearing for transmitting motion at various speeds from the driving to the driven shaft, a shifting arm to operate said gearing to change the speed, means for operating the clutch, and means connecting said arm and clutch-operating means to operate one by the movement of the other and to permit a limited relative movement between the same.

2. In a transmission-gearing, the combination with a driving and a driven shaft, of a clutch, gearing for transmitting motion at various speeds from the driving to the driven shaft, a shifting arm to operate the gearing to change the speed, a rod for operating the clutch, and a yielding connection between the arm and rod adapted to normally hold the arm to move with the rod and to yield to permit a limited movement of the rod relative to the arm.

3. In a transmission-gearing, the combination with a power-shaft, a driving-shaft, and a driven shaft, of a clutch to connect the power and driving shafts, gearing provided with a sliding gear for transmitting motion at various speeds from the driving to the driven shaft, a longitudinally-movable rod to operate the clutch, an arm to shift the sliding gear having eyes through which the rod extends, and means for yieldingly holding the arm upon the rod to permit it to move longitudinally therein a limited distance.

4. In a transmission-gearing, the combination with a power-shaft, a driving-shaft, and a driven shaft, of a clutch to connect the power and driving shafts, gearing provided with a sliding member for transmitting motion at various speeds from the driving to the driven shaft, a longitudinally-movable rod to operate the clutch having longitudinal slots, an arm to shift the sliding member having eyes through which the rod extends, transverse pins in the slots in the rod, and a coiled spring sleeved on the rod between the pins to hold the same in the outer ends of the slots.

5. In a transmission-gearing, the combination with a power-shaft, a driving-shaft and a driven shaft, of a clutch to connect the power and driving shafts, gearing for transmitting motion from the driving to the driven shaft embodying a sliding gear adapted to be moved into various position to transmit various speeds, a wheel provided with notches corresponding to the several operative positions of the sliding gear, a lever to move and release the clutch adapted to be operated by said notched wheel, and means for simultaneously moving the sliding gear and turning the said notched wheel.

6. In a transmission-gearing, the combination with a power-shaft, a driving-shaft and a driven shaft, of a clutch to connect the power and driving shafts, gearing for transmitting motion from the driving to the driven shaft provided with a sliding gear to vary the speed, a yoke pivotally attached to the clutch to move the same and provided with a friction-roll, a wheel to engage the roll formed with notches to receive the same, and a longitudinally-movable rod to turn the wheel and shift the sliding gear.

7. In a transmission-gearing, the combination with a power-shaft, a driving-shaft, and a driven shaft, of a clutch to connect the power and driving shafts, gearing for transmitting motion from the driving to the driven shaft provided with a sliding gear to vary the speed, a yoke pivotally attached to the clutch to move the same, a longitudinally-movable rod to shift the sliding gear, means operated by said rod to engage the yoke at one side of the clutch and move the same, and a cam at the opposite side of said yoke to engage and move the same independently of said means.

8. In a transmission-gearing, the combination with a power-shaft, a driving-shaft, and a driven shaft, of a clutch to connect the power and driving shafts, gearing for transmitting motion from the driving to the driven shaft provided with a sliding gear to vary the speed, a yoke pivotally attached to the clutch, shafts extending transversely of the yoke adjacent to its upper and lower sides, a cam on one of said shafts and a notched wheel on the other shaft to engage and operate the yoke independently of each other, a pinion on the shaft carrying the notched wheel, a rack to operate said pinion, and means movable with the rack for shifting the sliding gear.

9. In a transmission-gearing, the combination with the crank-shaft of a motor, of a driving-shaft and a driven shaft in axial alinement with the crank-shaft, a clutch to connect the crank-shaft and the driving-shaft consisting of a facing-disk secured on the driving-shaft, a facing-disk movable toward and from said disk, a series of friction-disks connected to the driving-shaft to turn therewith, a yoke secured to the crank-shaft, a series of friction-disks alternating with the other series of disks and engaging the yoke to turn with said crank-shaft, and means for moving the movable facing-disk to clamp the friction-disks; a variable-speed gearing consisting of a gear on the driving-shaft having a long face, a counter-shaft, a gear on the counter-shaft, a sliding gear on the driven shaft having internal teeth to engage the gear on the driving-shaft and formed with external teeth, and a pinion on the counter-shaft into mesh with which the sliding gear is adapted to be moved; a longitudinally-movable rod; an arm on said rod to shift the sliding gear; and means for operating the clutch actuated by said rod.

10. In a transmission-gearing, the combination with the crank-case and crank-shaft of an engine, of a casing formed integral with the crank-casing, a driving-shaft having a tubular end to receive the end of the crank-shaft and an axial bore at its opposite end, a bearing in the casing for said end of said shaft, a driven shaft engaging the bore of the driving-shaft at one end and a bearing in the end of the casing and formed with a square portion, a gear on the end of the driving-shaft, a sliding gear on the squared portion of the driven shaft having internal teeth to engage the gear on the driving-shaft and having external teeth, a counter-shaft mounted in bearings on the casing, a gear on the counter-shaft in mesh with the gear on the driving-shaft, pinions on the counter-shaft one of which is adapted to be engaged by the external teeth of the sliding gear, an idler engaging the other pinion adapted to be engaged by said external teeth, a friction-clutch on the tubular end of the driving-shaft to connect the crank-shaft thereto, transverse shafts in the casing adjacent to the upper and lower sides of said clutch, a yoke for operating the clutch, means on said transverse shafts for operating the yoke, a pinion on one of said shafts, a rack to engage and turn said pinion, a rod to actuate the rack, and an arm on the rod to move the sliding gear.

11. In a transmission-gearing, the combination with a crank-shaft and a crank-casing within which the same is mounted, of a casing formed integral with the crank-casing, a driving-shaft mounted at one end in a bearing in the casing and formed tubular to receive the end of the crank-shaft, a driven shaft having a squared portion, gearing for transmitting motion from the driving to the driven shaft having a sliding gear engaging the squared portion of the driven shaft, a facing-disk on the forward end of the driving-shaft, an opposing facing-disk movable toward and from the first disk and provided with a rearwardly-extending sleeve, a yoke fixed on the crank-shaft, two series of friction-disks interposed between the facing-disks one series being connected to the driving-shaft and the other to the yoke, a collar on the driving-shaft, a spring sleeved on said shaft between said collar and movable facing-disk, a thrust-bearing on the driving-shaft bearing against the forward side of the bearing for said shaft, a yoke pivotally attached to the sleeve on the movable facing-disk, a transverse shaft extending across the casing adjacent to said yoke, a notched wheel on said shaft to engage and operate said yoke, and means for turning said shaft and shifting the sliding gear at the same time.

12. In a transmission-gearing, the combination with a crank-shaft and crank-casing, of a casing formed integral with said crank-casing, a driving-shaft consisting of a tubular portion to receive the end of the crank-shaft and a bearing end having an axial bore, a driven shaft having an end engaging the bore of the driving-shaft, a yoke secured to the crank-shaft, a facing-disk secured to the tubular end of the driving-shaft, a movable facing-disk, friction-disks attached to the driving-shaft, friction-disks between said disks having notches in their peripheries engaged by said yoke, a sleeve on the movable facing-disk, a collar on the driving-shaft, a spring interposed between said collar and movable disk, a thrust-bearing between the collar and the bearing for the shaft, a ring on the sleeve of the movable disk, a yoke pivotally attached to said ring and formed with upwardly-extending ears on its upper side and downwardly-extending ears on its lower side, rolls between said ears, an adjusting-pin pivotally attached to said ears at the upper side and movable in a bearing, an adjusting-nut on said pin, a transverse shaft adjacent to the yoke at its upper side, a cam on said shaft to engage the roll, a lever on said shaft to operate the same, a transverse shaft adjacent to the lower side of the yoke, a notched wheel on said shaft to engage the roll, a pinion on said shaft, a longitudinally-movable rack-bar engaging said pinion, a rod attached to said bar, gearing for transmitting motion from the driving to the driven shaft having a sliding gear, a forked arm engaging the hub of said sliding gear and formed with eyes to receive the rod, and means for yieldingly holding the arm from longitudinal movement on the rod.

In testimony whereof I affix my signature in presence of two witnesses.

CHARLES H. BROOKS.

Witnesses:
OTTO F. BARTHEL,
THOS. G. LONGSTAFF.